US008370019B2

(12) United States Patent
Bian et al.

(10) Patent No.: US 8,370,019 B2
(45) Date of Patent: Feb. 5, 2013

(54) METHOD AND FACILITY FOR ESTIMATING A MEASURE OF FRICTION

(75) Inventors: Ning Bian, Eschborn (DE); Jens Fiedler, Thalmassing (DE); Celine Gamulescu, Regensburg (DE); Andreas Mayer, Freiburg (DE)

(73) Assignee: Continental Automotive GmbH, Hannover (DE)

( * ) Notice: Subject to any disclaimer, the term of this patent is extended or adjusted under 35 U.S.C. 154(b) by 701 days.

(21) Appl. No.: 12/515,573

(22) PCT Filed: Oct. 22, 2007

(86) PCT No.: PCT/EP2007/061276
§ 371 (c)(1),
(2), (4) Date: Jan. 7, 2010

(87) PCT Pub. No.: WO2008/061852
PCT Pub. Date: May 29, 2008

(65) Prior Publication Data
US 2010/0145566 A1 Jun. 10, 2010

(30) Foreign Application Priority Data
Nov. 21, 2006 (DE) .......................... 10 2006 054 805

(51) Int. Cl.
*G06F 17/10* (2006.01)
(52) U.S. Cl. ..................... 701/32.9; 701/31.4; 701/34.4; 703/2; 703/8; 73/8; 73/9
(58) Field of Classification Search .................. 701/29.1, 701/31.4, 32.9, 34.4; 703/1, 2, 6–8; 73/7–9
See application file for complete search history.

(56) References Cited

U.S. PATENT DOCUMENTS
5,576,959 A * 11/1996 Hrovat et al. .................. 701/70
(Continued)

FOREIGN PATENT DOCUMENTS
DE 3912014 10/1990
DE 19549715 9/2004
(Continued)

OTHER PUBLICATIONS

Peng et al, S.-T., A Control Scheme for Automatic Path Tracking of Vehicles Subject to Wheel Slip Constraint, Proceedings of the 2004 American Control Conference, Jun. 30-Jul. 2, 2004, pp. 804-809.*

(Continued)

*Primary Examiner* — Russell Frejd
(74) *Attorney, Agent, or Firm* — King & Spalding L.L.P.

(57) ABSTRACT

A friction coefficient between at least one tire of a motor vehicle and a roadway is estimated recursively. A kingpin inclination angle is detected or measured. A model determines a lateral friction value by defining a functional correlation between that value and the angle such that a non-linear course of that value relative to the angle is dependant on an initial increase of that value relative to the angle and on a recursively determined estimated value of the friction coefficient. The initial increase is defined substantially independently from the recursively determined estimated value. In addition, a measurement variable of the driving dynamics is captured. Depending on the lateral friction value, the driving dynamics model variable is determined. Furthermore, a variance between the driving dynamics measurement variable and the driving dynamics model value is determined. The recursion when acquiring the estimated value includes that the estimated value is adjusted.

15 Claims, 3 Drawing Sheets

U.S. PATENT DOCUMENTS

| | | | |
|---|---|---|---|
| 5,711,025 A * | 1/1998 | Eckert et al. | 701/83 |
| 5,747,682 A | 5/1998 | Hirano | 73/118.1 |
| 5,862,503 A * | 1/1999 | Eckert et al. | 701/78 |
| 5,869,753 A * | 2/1999 | Asanuma et al. | 73/117.01 |
| 5,899,952 A * | 5/1999 | Fukada | 701/74 |
| 6,650,987 B2 * | 11/2003 | Kogure et al. | 701/80 |
| 7,234,339 B2 | 6/2007 | Kogure | 73/9 |
| 7,248,953 B2 * | 7/2007 | Ogawa | 701/30.2 |
| 7,366,598 B2 * | 4/2008 | Ono et al. | 701/30.2 |
| 7,680,577 B2 * | 3/2010 | Mori | 701/70 |
| 2004/0133330 A1 * | 7/2004 | Ono et al. | 701/80 |

FOREIGN PATENT DOCUMENTS

| | | |
|---|---|---|
| EP | 1510428 | 3/2005 |
| EP | 1627790 | 2/2006 |
| JP | 9142280 A | 6/1997 |

OTHER PUBLICATIONS

Ray, L., Nonlinear Tire Force Estimation and Road Friction Identification: Simulation and Experiments, Automatica, vol. 33, No. 10, Oct. 1997, pp. 1819-1833.*

German Office Action for Application No. 10 2006 054 805.1 (3 pages), Dec. 17, 2008.

International Search Report for Application No. PCT/EP2007/061276 (6 pages), Jan. 28, 2008.

Ray L R: "Nonlinear State and Tire Force Estimation for Advanced Vehicle Control", IEEE Transactions on Control Systems Technology, IEEE Service Center, New York, US, BD. 3 Nr. 1 Mar. 1, 1995; pp. 117-124, XP 000508619, ISSN: 1063-6536, figures 2 and 7, p. 121 (1 page), Mar. 1, 1995.

* cited by examiner

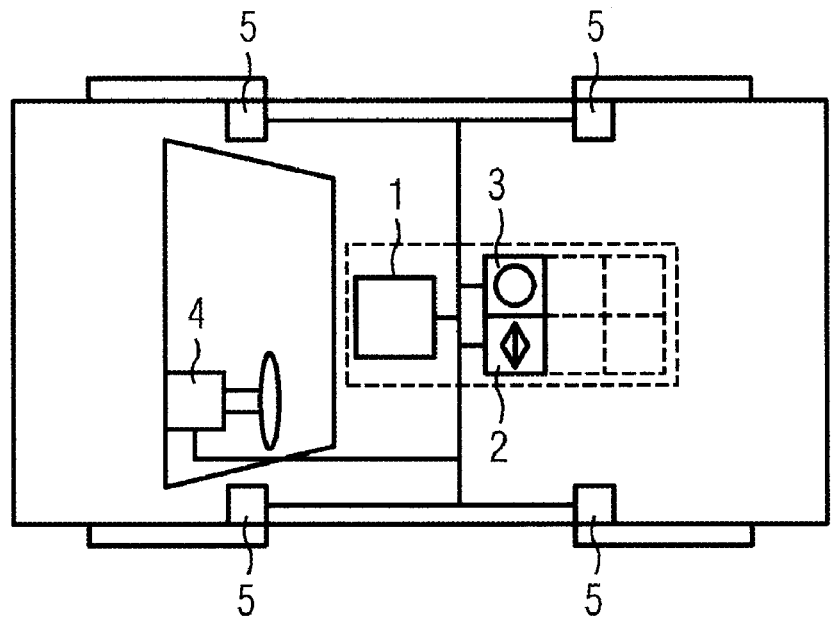
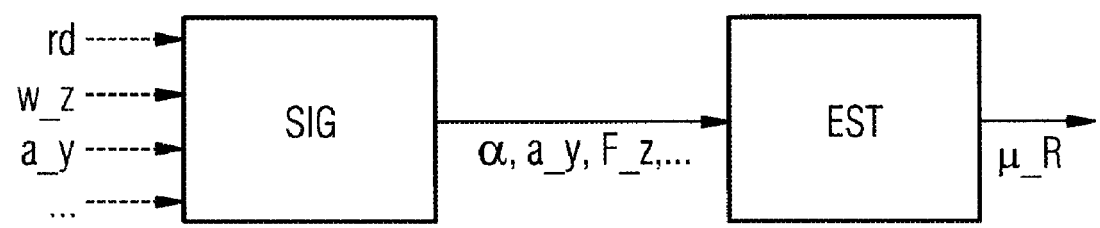

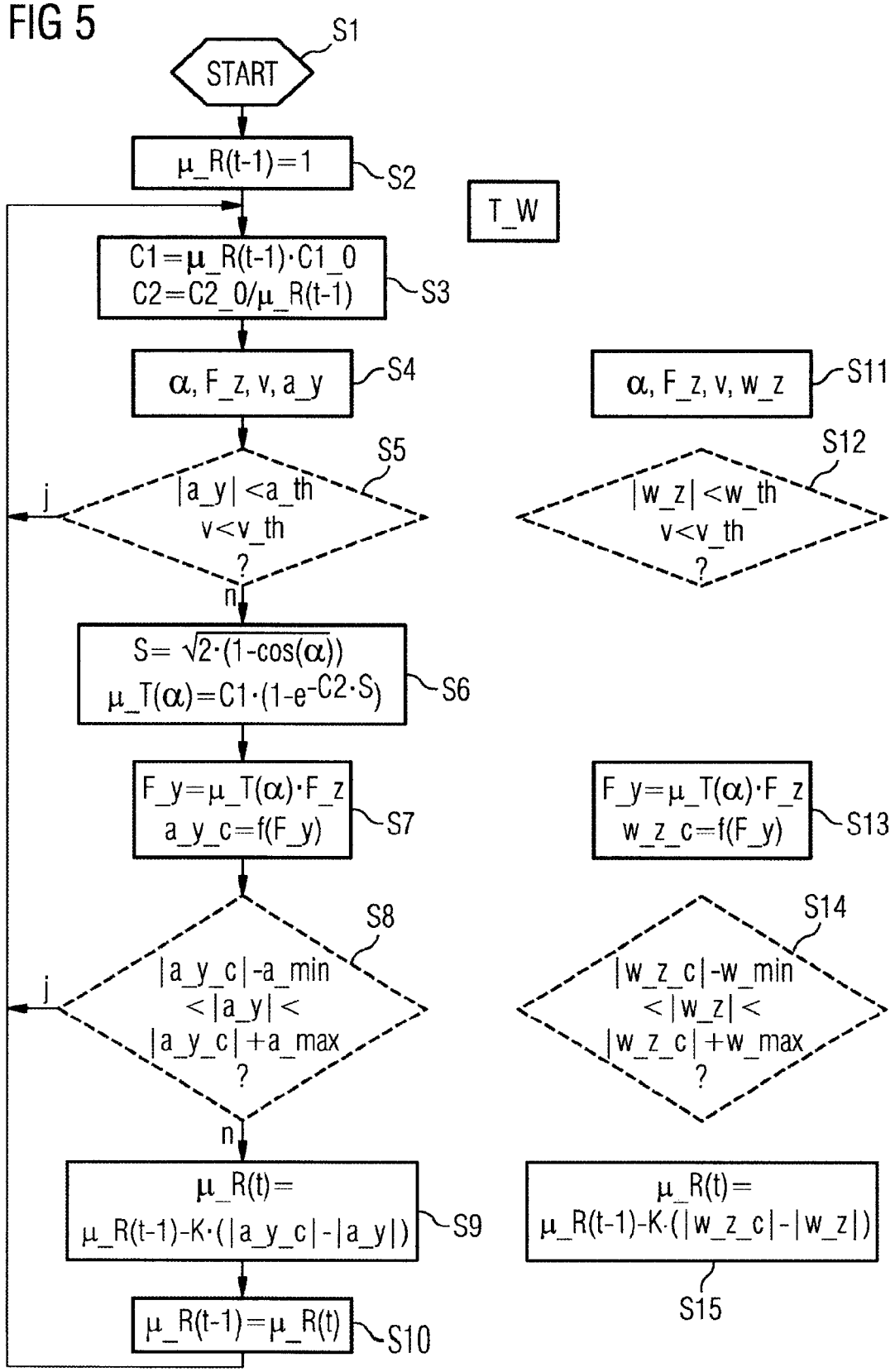

METHOD AND FACILITY FOR ESTIMATING A MEASURE OF FRICTION

CROSS-REFERENCE TO RELATED APPLICATIONS

This application is a U.S. National Stage Application of International Application No. PCT/EP2007/061276 filed Oct. 22, 2007, which designates the United States of America, and claims priority to DE Application No. 10 2006 054 805.1 filed Nov. 21, 2006, the contents of which are hereby incorporated by reference in their entirety.

TECHNICAL FIELD

The invention relates to a method and a corresponding facility for estimating a measure of friction between at least one tire on a vehicle and a road surface.

BACKGROUND

DE 39 120 14 A1 discloses a method for determining a value for the friction between a road surface and a tire on a vehicle. As the vehicle approaches a driving condition which is dynamically critical in a lateral direction, values are sensed or calculated for its steering angle, travel speed, velocity of angular yaw and lateral acceleration. Using a mathematical reference model of the vehicle, a reference or intended velocity of angular yaw is determined as a function of the steering angle and the travel speed. In addition, a difference is determined between the actual velocity of angular yaw of the vehicle and the reference or intended velocity of angular yaw. As a measure of the value of the friction between the road surface and the tires of the vehicle, the value of the lateral acceleration is determined for which the difference between the actual velocity of angular yaw and the reference or intended velocity of angular yaw starts to rise steeply.

EP 1 627 790 A1 discloses a method for estimating a coefficient of friction. A steering angle and a lateral acceleration are sensed. An estimated value of the coefficient of friction is determined by means of a table. This table provides several ranges for different steering angles and lateral accelerations, to which are assigned several coefficients of friction. Depending on the steering angle which is sensed and the lateral acceleration which is sensed, the associated range in the table is selected and the assigned coefficient of friction is used as the estimated value of the coefficient of friction.

SUMMARY

According to various embodiments, a method and a corresponding facility for estimating a measure of friction can be provided which are reliable.

According to an embodiment, a method for estimating a measure of friction between at least one tire on a vehicle and a road surface, may comprise the steps of: —sensing or determining an off-line steering angle, —determining a value of the lateral friction between the at least one tire of the vehicle and the road surface by means of a model, in that a functional relationship between the value of the lateral friction and the off-line steering angle is defined in such a way that a non-linear graph of the value of the lateral friction against the off-line steering angle is a function of the initial slope of the value of the lateral friction against the off-line steering angle and of a recursively determined estimated value of the measure of friction, and that the initial slope is independent of the recursively determined estimated value of the measure of friction, —sensing a measured vehicle dynamics variable for the vehicle, —determining a vehicle dynamics model variable which corresponds to the measured vehicle dynamics variable as a function of the value of the lateral friction, and determining the variance between the measured vehicle dynamics variable and the vehicle dynamics model variable and wherein—the recursion when determining the estimated value of the measure of friction includes its modification as a function of the variance which has been determined.

According to a further embodiment, an arrangement for estimating a measure of friction between at least one tire on a vehicle and a road surface, may be operable—to sense or determine an off-line steering angle, —to determine the value of the lateral friction, between the at least one tire on the vehicle and the road surface, by means of a model in which a functional relationship between the value of the lateral friction and the off-line steering angle is defined in such a way that a non-linear graph of the value of the lateral friction against the off-line steering angle is a function of the initial slope of the value of the lateral friction against the off-line steering angle and of a recursively determined estimated value of the measure of friction, and that the initial slope is independent of the recursively determined estimated value of the measure of friction, —to sense a measured vehicle dynamics variable for the vehicle, —to determine a vehicle dynamics model variable which corresponds to the measured vehicle dynamics variable, as a function of the value of the lateral friction and to determine the variance of the measured vehicle dynamics variable from the vehicle dynamics model variable, and wherein—for determining recursively the estimated value of the measure of friction, and the recursion includes modification of the estimated value of the measure of friction as a function of the variance which has been determined.

According to a further embodiment, the functional relationship in the model may be defined by $$\mu\_T = C1(1-\exp(-C2 \cdot S)) - C3 \cdot S$$

where $S = \mathrm{sqrt}(2 \cdot (1 - \cos(\alpha)))$ and
$C1 = \mu\_R \cdot C1\_0$ and
$C2 = C2\_0 / \mu\_R$
with first and second constants $C1\_0$, $C2\_0$.

BRIEF DESCRIPTION OF THE DRAWINGS

Exemplary embodiments of the invention are explained below by reference to the schematic drawings. These show:
FIG. 1 a vehicle,
FIG. 2 a facility for estimating a measure of friction,
FIG. 3 a first diagram of the value of the lateral friction,
FIG. 4 a second diagram of the value of the lateral friction showing an enlargement of a section of the first diagram shown in FIG. 3, and
FIG. 5 a flow diagram for the estimation of the measure of friction.

Figure 3:
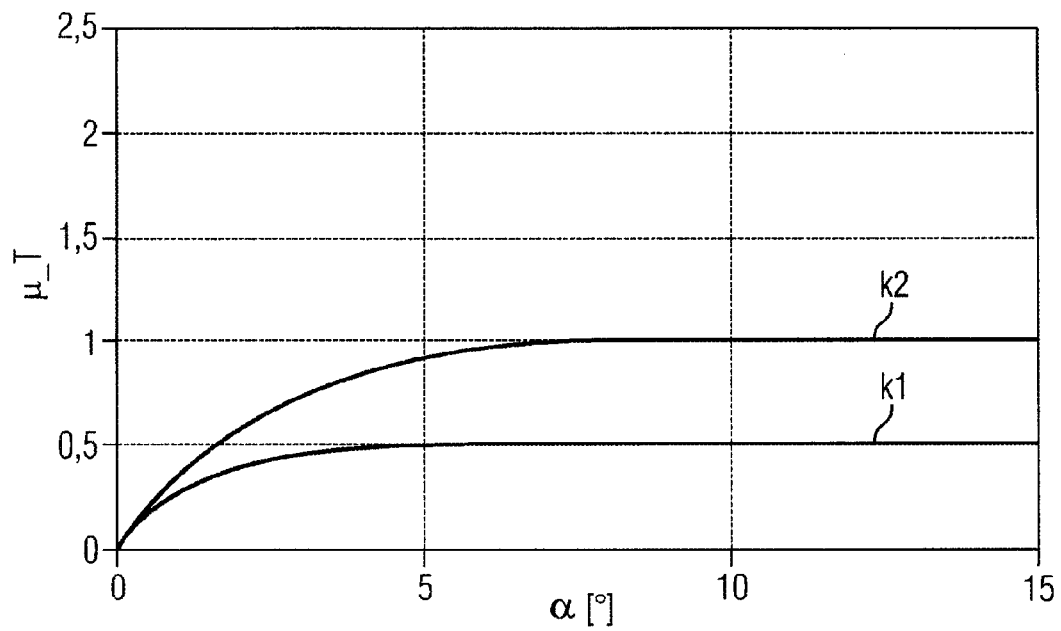

Elements which have the same design or function have the same reference marks in all the figures.

DETAILED DESCRIPTION

According to various embodiments, in a method and a corresponding facility for estimating a measure of friction between at least one tire on a vehicle and a road surface. An off-line steering angle is sensed or determined, a value of the lateral friction between at least one tire on the vehicle and the road surface is determined using a model, in that a functional relationship between the value of the lateral friction and the off-line steering angle is defined in such a way that a non-linear graph of the value of the lateral friction against the off-line steering angle is dependent on the initial slope of the value of the lateral friction relative to the off-line steering angle and on a recursively determined estimated value of the measure of friction. Furthermore, the functional relationship is defined in such a way that the initial slope is essentially independent of the recursively determined estimated value of the measure of friction. In addition, a measured variable for the vehicle dynamics is sensed on the vehicle. In a vehicle dynamics model, the value of a variable which corresponds to the measured variable for the vehicle dynamics is determined as a function of the value of the lateral friction. Further, a variance is determined, between the measured variable for the vehicle dynamics and the value of the variable in a vehicle dynamics model. The recursion in the determination of the estimated value of the measure of friction includes modification of the latter as a function of the variance determined.

The off-line steering angle is defined as the angle between a plane, through the wheel and perpendicular to an axis of the wheel, and the direction of movement of a contact area over which the tire and the road surface are in contact. The value of the lateral friction is defined as the quotient of a lateral force imposed on the tire and the downforce of the tire on the road surface. The measure of friction characterizes the friction between the tire and the road surface, and is defined as the quotient of a maximum force which the tire can exert on the road surface in a direction parallel to the road surface and the downforce or as a limiting value of this quotient for large slippage values.

The term initial slope is to be understood as the slope of the graph of the value of the lateral friction against the off-line steering angle for off-line steering angles with a small magnitude. In particular, the initial slope corresponds to the value limit of the slope of the graph as the off-line steering angle tends to zero.

The measured variable for the vehicle dynamics and the value of the variable in the vehicle dynamics model relate, for example, to a lateral acceleration or a_yaw rate for the vehicle, or to some other suitable variable which can be sensed by means of sensors or can be determined from measured values which are sensed, and can be determined from the model as a function of the value of the lateral friction.

It has been recognized that estimation of the measure of friction can be effected in a particularly robust and reliable way if the model used for determining the value of the lateral friction is such that the initial slope of the graph of the value of the lateral friction against the off-line steering angle is defined essentially independently of the recursively determined estimated value for the measure of friction, and in particular is defined to be constant. Because of the functional relationship in the model, between the value of the lateral friction and the off-line steering angle, a non-linear graph of the value of the lateral friction against the off-line steering angle is therefore broadly defined, and is essentially then only dependent on the estimated value of the measure of friction. Changes in the measure of friction can thus be easily and reliably detected.

In an advantageous embodiment, the functional relationship in the model is defined by $\mu\_T = C1 \cdot (1 - \exp(-C2 \cdot S)) - C3 \cdot S$ where $S = \sqrt{2 \cdot (1 - \cos(\alpha))}$ and $C1 = \mu\_R \cdot C1\_0$ and $C2 = C2\_0/\mu\_R$ with a first and a second constant. The use of this functional relationship in determining the value of the lateral friction has the advantage that the value of the lateral friction can in this way be easily determined, and the initial slope of the graph of the value of the lateral friction against the off-line steering angle is essentially independent of the recursively determined estimated value of the measure of friction and is, furthermore, essentially constant. This makes possible a reliable and precise estimation of the measure of friction.

A vehicle has an evaluation facility 1 and sensors (FIG. 1). The sensors are linked to the evaluation facility 1. The sensors are designed, in particular, for the purpose of sensing measured variables for the vehicle dynamics. Such sensors are, in particular, a lateral acceleration sensor 2 for sensing a lateral acceleration a_y which is sensed, and/or a yaw rate sensor 3 for sensing a_yaw rate w_z which is sensed and/or a steering wheel angle sensor 4 for sensing the angle of the steering wheel. Furthermore there is, preferably, arranged on each wheel of the vehicle, a wheel rotation rate sensor 5, in each case for sensing the rotation rate rd of one wheel. Each of the sensors is linked to the evaluation facility 1 to which it feeds the measured values it senses. In addition, other sensors can also be provided, for example a longitudinal acceleration sensor.

A signal processing unit SIG, for processing the measured values fed from the sensors to the evaluation facility 1 (FIG. 2), is provided in the evaluation facility 1. In addition, an estimation unit EST is provided, this being connected on its input side to the output from the signal processing unit SIG. To the signal processing unit SIG are fed, in particular, the wheel rotation rates rd which are sensed, the lateral acceleration a_y which is sensed and the yaw rate w_z which is sensed. However, other measured values for other measured variables can also be fed to the signal processing unit SIG.

The processing of the measured values concerned can include, for example, a filtering and in particular a low-pass filtering and/or a correction or conversion of the measured values which have been sensed. In addition, the signal processing unit SIG can be designed for determining, as a function of the measured values fed to it, derived measured variables, for example taking into account models of the vehicle dynamics for the vehicle or by simple computational combination of two or more of the measured values, which have been sensed for different measured variables, to give one measured value for a measured variable derived from them. Such a derived measured variable is, for example, the velocity v of the vehicle, which can be determined as a function of the wheel rotation rates rd which are sensed, or the downforce F_z exerted vertically down on the road surface by the wheel. In addition, it is also possible to determine the off-line steering angle α as a function of the yaw rate w_z which has been sensed. However, the derived measured variables cited can also be determined or sensed in other ways.

Figure 4:
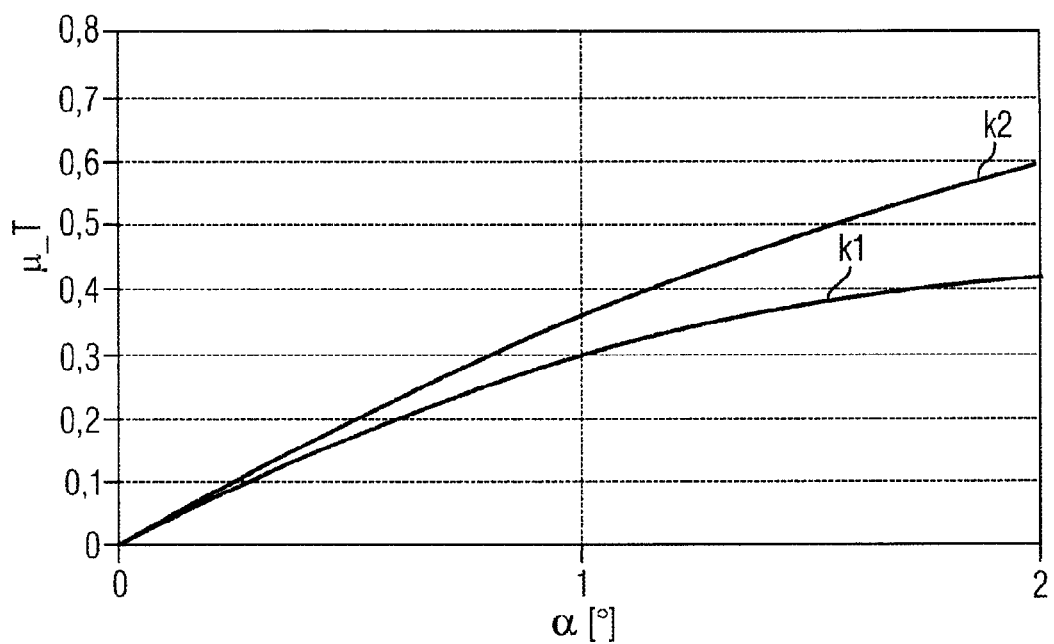

The estimation unit EST is designed to determine, as a function of the measured values which have been sensed or determined and fed to it, an estimated value for a measure of friction μ_R between at least one tire on the vehicle and a road surface. For the estimation of the measure of friction μ_R, a value μ_T for the lateral friction is determined by means of a model, as a function of the off-line steering angle α which has been sensed or determined. In the model there is a non-linear functional relationship between the value μ_T of the lateral friction and the off-line steering angle α, examples of which are shown in FIGS. 3 and 4, for different estimated values of the measure of friction μ_R, by a first curve k1 and a second curve k2. The estimated value of the measure of friction μ_R for the first curve k1 is 0.5 and for the second curve k2 is 1.

An initial slope of the value μ_T of the lateral friction against the off-line steering angle α is essentially independent of the estimated value of the measure of friction μ_R and is preferably constant. In a particularly preferred form of embodiment, the non-linear functional relationship between the value $\mu\_T$ of the lateral friction and the off-line steering angle $\alpha$ is given by $$\mu\_T = C1 \cdot (1 - \exp(-C2 \cdot S)) - C3 \cdot S$$

where $S = \mathrm{sqrt}(2 \cdot (1 - \cos(\alpha)))$

Here, exp represents an exponential function and sqrt a square root. In addition, a first parameter C1 is defined as the product of the estimated value of the measure of friction, $\mu\_R$, and a first constant $C1\_0$, and a second parameter is defined as the quotient of a second constant $C2\_0$ and the estimated value of the measure of friction, $\mu\_R$. The first constant $C1\_0$ will preferably have a value of about 1 and the second constant $C2\_0$ a value of about 25. The first and second constants $C1\_0$, $C2\_0$ can however also be otherwise defined. A third parameter C3 will preferably have a small value, for example about 0.2. For small off-line steering angles $\alpha$, and in particular in relation to the initial slope of the value $\mu\_T$ of the lateral friction against the off-line steering angle $\alpha$, the term $-C3 \cdot S$ is negligible. In a particularly preferred form of embodiment, the value of the third parameter C3 is zero. This makes the determination of the value $\mu\_T$ of the lateral friction particularly simple.

Forming a series expansion of the exponential function and terminating it after the first term gives the simplified representation $1-C2 \cdot S$ for the exponential function with the argument $-C2 \cdot S$. For small off-line steering angles $\alpha$ the value $\mu\_T$ of the lateral friction then becomes approximately equal to $C1 \cdot C2 \cdot S = C1\_0 \cdot C2\_0 \cdot S$. The initial slope of the value $\mu\_T$ of the lateral friction against the off-line steering angle $\alpha$ is thus essentially independent of the estimated value of the measure of friction $\mu\_R$, and furthermore is essentially constant. Such a relationship between the value $\mu\_T$ of the lateral friction and the off-line steering angle $\alpha$ permits especially reliable and robust estimation of the measure of friction $\mu\_R$. However, the non-linear functional relationship between the value $\mu\_T$ of the lateral friction and the off-line steering angle $\alpha$ can also be otherwise defined.

FIG. 5 shows the flow diagram of a program for estimating the measure of friction $\mu\_R$. This program starts with a step S1. In a step S2, the estimated value for the measure of friction $\mu\_R$ for a time point t−1 is set to a defined value, for example 1.

In a step S3, the product of the estimated value of the measure of friction, $\mu\_R$, at the time t−1 and the first constant $C1\_0$ is assigned to the first parameter C1. In addition, the quotient of the second constant $C2\_0$ and the estimated value of the measure of friction $\mu\_R$ at the time t−1 is assigned to the second parameter C2. In the step S4, the off-line steering angle $\alpha$, the downforce $F\_z$, the vehicle speed v and the lateral acceleration $a\_y$ which is sensed, are sensed or determined. In the step S5 a check is preferably made as to whether the value of the lateral acceleration $a\_y$ which is sensed is less than a defined lower lateral acceleration threshold $a\_th$. The value of the defined lower lateral acceleration threshold $a\_th$ will be about 0.5 m/s$^2$, for example, but can however also be defined as a value greater or less than 0.5 m/s$^2$. In addition, a check will preferably by made in step S5 as to whether the vehicle's speed v is less than a defined lower speed threshold $v\_th$. The value of the defined lower speed threshold $v\_th$ will be about 5 m/s, for example, but can however also be defined as a value greater or less than 5 m/s. If the conditions in step S5 are fulfilled, then the program will continue with step S3.

However, if the conditions in step S5 are not met, then the value $\mu\_T$ of the lateral friction is determined as a function of the off-line steering angle $\alpha$, in step 6. In step S7, a calculated lateral acceleration $a\_y\_c$ is determined in a vehicle dynamics model as a variable which is a function of the value $\mu\_T$ of the lateral friction, and is preferably smoothed by low-pass filtering. For example, a lateral force $F\_y$ is determined as the product of the value $\mu\_T$ of the lateral friction which has been determined and the downforce $F\_z$. The calculated lateral acceleration $a\_y\_c$ can then be determined as a function of the lateral force $F\_y$ which has been determined.

In step S8 a check is preferably made on whether the lateral acceleration $a\_y$ which has been sensed lies within a defined tolerance range about the calculated lateral acceleration $a\_y\_c$. A lower limit for the defined tolerance range is given by the difference between the magnitudes of the calculated lateral acceleration $a\_y\_c$ and of a lower acceleration tolerance limit value $a\_min$. Correspondingly, the upper limit of the defined tolerance range is defined by the sum of the magnitudes of the calculated lateral acceleration $a\_y\_c$ and of an upper acceleration tolerance limit value $a\_max$. If the magnitude of the lateral acceleration $a\_y$ which has been determined lies within the defined tolerance range, then the program continues with step S3. Otherwise the estimated value of the measure of friction $\mu\_R$ is adjusted, in step S9. The adjustment of the estimated value of the measure of friction $\mu\_R$ is made in such a way that the value assigned as the estimated value of the measure of friction $\mu\_R$ at a point in time t is the difference between the estimated value of the measure of friction $\mu\_R$ at a point in time t−1 and the product of a factor K and the difference between the magnitude of the calculated lateral acceleration $a\_y\_c$ and the magnitude of the lateral acceleration $a\_y$ which has been sensed. Then in step S10 the estimated value of the measure of friction $\mu\_R$ at time t is assigned as the estimated value of the measure of friction $\mu\_R$ at time t−1, for a subsequent adjustment step in accordance with steps S3 to S9. The program continues at step S3. In this way, the estimated value of the measure of friction, $\mu\_R$, is determined recursively.

The program will preferably only be continued after a waiting time with a duration of $T\_W$ has expired. The duration of the waiting time $T\_W$ will correspond, for example, to a sampling interval over which the measured values are sensed or determined, or to a defined time interval for the adjustment, and hence updating, of the estimated value of the measure of friction $\mu\_R$. The factor K is defined, for example, as about 1.5 s/m·$T\_W$. However, the factor K can also be otherwise defined.

The program can also be executed appropriately if, instead of the sensed and calculated lateral accelerations, $a\_y$ and $a\_y\_c$, the sensed and calculated yaw rates, $w\_z$ and $w\_z\_c$, are used for estimation of the measure of friction $\mu\_R$. For this purpose, instead of the step S4 there is a step S11, for example, in which the off-line steering angle $\alpha$, the downforce $F\_z$, the vehicle speed v and the sensed yaw rate $w\_z$ are sensed or determined. In step S12, which replaces step S5, a check is made as to whether the magnitude of the yaw rate $w\_z$ which has been sensed is less than a defined lower yaw rate threshold $w\_th$ and whether the vehicle's speed v is less than the defined lower speed threshold $v\_th$. Instead of step S7 there is a step S13, in which the calculated yaw rate $w\_z\_c$ is determined in a vehicle dynamics model as a variable which is a function of the value $\mu\_T$ of the lateral friction which has been determined, and is preferably smoothed by low-pass filtering. Instead of step S8 there is a step S14, in which a check is made as to whether the magnitude of the sensed yaw rate $w\_z$ lies within a defined tolerance range about the calculated yaw rate $w\_z\_c$. A lower limit for the defined tolerance range is defined by the difference between the magnitude of the calculated yaw rate $w\_z\_c$ and a lower yaw rate tolerance limit value $w\_min$. An upper limit for the defined tolerance range is defined by the sum of the magnitude of the calculated yaw rate w_z_c and an upper yaw rate tolerance limit value w_max. Rather than in step S9, the adjustment of the estimated value of the measure of friction μ_R is effected in step S15. In step S15, the value inserted into the estimated value of the measure of friction μ_R at a point in time t is the difference between the estimated value of the measure of friction μ_R at a point in time t−1 and the product of a factor K and the difference between the magnitudes of the calculated yaw rate w_z_c and of the sensed yaw rate w_z.

The program can also be executed appropriately if, instead of using the sensed and calculated lateral accelerations, a_y and a_y_c, or the sensed and calculated yaw rates, w_z and w_z_c, for estimation of the measure of friction μ_R, use is made of other vehicle dynamics variables which can be sensed as measured values and can be determined as model variables. Examples of such other vehicle dynamics variables are the acceleration in yaw rate, or yawing moment.

The invention claimed is:

1. A method for estimating a measure of friction between at least one tire on a vehicle and a road surface, the method comprising the steps of:
sensing or determining an off-line steering angle,
determining a value of the lateral friction between the at least one tire of the vehicle and the road surface by means of a model, in that a functional relationship between the value of the lateral friction and the off-line steering angle is defined in such a way that a non-linear graph of the value of the lateral friction against the off-line steering angle is a function of the initial slope of the value of the lateral friction against the off-line steering angle and of a recursively determined estimated value of the measure of friction, and that the initial slope is independent of the recursively determined estimated value of the measure of friction,
sensing a measured vehicle dynamics variable for the vehicle,
determining a vehicle dynamics model variable which corresponds to the measured vehicle dynamics variable as a function of the value of the lateral friction, and
determining the variance between the measured vehicle dynamics variable and the vehicle dynamics model variable, and
wherein the recursion when determining the estimated value of the measure of friction includes its modification as a function of the variance which has been determined.

2. The method according to claim 1, in which the functional relationship in the model is defined by
μ−T=C1·(1−exp(−C2·S))−C3·S where S=sqrt(2·(1−cos(α))) and C1=μ_R·C1_0 and C2=C2_0/μ_R with first and second constants C1_0, C2_0.

3. An arrangement for estimating a measure of friction between at least one tire on a vehicle and a road surface, which is operable:
to sense or determine an off-line steering angle,
to determine the value of the lateral friction, between the at least one tire on the vehicle and the road surface, by means of a model in which a functional relationship between the value of the lateral friction and the off-line steering angle is defined in such a way that a non-linear graph of the value of the lateral friction against the off-line steering angle is a function of the initial slope of the value of the lateral friction against the off-line steering angle and of a recursively determined estimated value of the measure of friction, and that the initial slope is independent of the recursively determined estimated value of the measure of friction,
to sense a measured vehicle dynamics variable for the vehicle,
to determine a vehicle dynamics model variable which corresponds to the measured vehicle dynamics variable, as a function of the value of the lateral friction and to determine the variance of the measured vehicle dynamics variable from the vehicle dynamics model variable,
and to determine recursively the estimated value of the measure of friction, the recursion including modification of the estimated value of the measure of friction as a function of the variance which has been determined.

4. The arrangement according to claim 3, wherein the functional relationship in the model is defined by
μ−T=C1·(1−exp(−C2·S))−C3·S where S=sqrt(2·(1−cos(α))) and C1=μ_R·C1_0 and C2=C2_0/μ_R with first and second constants C1_0, C2_0.

5. A vehicle comprising an arrangement according to claim 3 and further comprising sensors linked to the arrangement, wherein the sensors are designed to sense measured variables for the vehicle dynamics.

6. The vehicle according to claim 5, wherein the sensors are selected from the group consisting of a lateral acceleration sensor, a longitudinal acceleration sensor, a_yaw rate sensor, a steering wheel angle sensor and a wheel rotation rate sensor.

7. The vehicle according to claim 5, wherein the arrangement comprises a signal processing unit for processing measured values fed from the sensors.

8. The vehicle according to claim 7, wherein the arrangement further comprises an estimation unit connected on an input side to an output from the signal processing unit.

9. The vehicle according to claim 7, wherein the signal processing unit receives wheel rotation rates, a lateral acceleration and a_yaw rate.

10. The vehicle according to claim 7, wherein the signal processing unit is operable to perform at least one of a low-pass filtering and a correction or conversion of sensed measured values.

11. The vehicle according to claim 7, wherein the signal processing unit is designed to determine, as a function of the measured values fed to it, derived measured variables taking into account models of the vehicle dynamics for the vehicle or by simple computational combination of two or more of the measured values.

12. The vehicle according to claim 11, wherein a derived measured variable is selected from the group consisting of a velocity of the vehicle and a downforce exerted vertically down on the road surface by the wheel.

13. The vehicle according to claim 7, wherein the signal processing unit is operable to determine the off-line steering angle as a function of a_yaw rate.

14. The vehicle according to claim 8, wherein the estimation unit determines the estimated value for a measure of friction between at least one tire on the vehicle and a road surface.

15. The vehicle according to claim 8, wherein the signal processing unit and the estimation unit are operable to determine the friction at least one of a yaw rate and a_yawing moment.

* * * * *